United States Patent [19]
Willard

[11] Patent Number: 5,325,541
[45] Date of Patent: Jul. 5, 1994

[54] WATERPROOF OVERSOCK

[75] Inventor: Ellery T. Willard, Johnstown, N.Y.

[73] Assignee: Gates-Mills, Inc., Johnstown, N.Y.

[21] Appl. No.: 11,506

[22] Filed: Jan. 29, 1993

[51] Int. Cl.⁵ .............................................. A41B 11/00
[52] U.S. Cl. ........................................... 2/239; 36/9 R
[58] Field of Search ............... 2/239, 240, 241; 36/4, 36/7.1 R, 7.3, 9 R

[56] References Cited

U.S. PATENT DOCUMENTS

| | | |
|---|---|---|
| 2,343,477 | 3/1944 | Ross . |
| 2,496,142 | 1/1950 | Aroeste . |
| 2,531,839 | 11/1950 | Camp ................................ 2/239 |
| 2,582,648 | 1/1952 | Mowbray . |
| 3,000,118 | 9/1961 | O'Shea . |
| 3,016,631 | 1/1962 | Servin . |
| 3,402,323 | 9/1968 | Longstreth . |
| 3,863,272 | 2/1975 | Guille . |
| 4,204,345 | 5/1980 | Bradley . |
| 4,376,344 | 3/1983 | Kimsey . |
| 4,443,511 | 4/1984 | Worden et al. . |
| 4,499,675 | 2/1985 | Perotto . |
| 4,516,336 | 5/1985 | Nissenbaum . |
| 4,538,368 | 9/1985 | Mugford . |
| 4,550,446 | 11/1985 | Herman . |
| 4,562,834 | 1/1986 | Bates et al. . |
| 4,809,447 | 3/1989 | Pacanowsky et al. . |
| 4,825,564 | 5/1989 | Source . |
| 4,910,889 | 3/1990 | Bonaventure et al. . |
| 4,967,494 | 11/1990 | Johnson ................................ 36/9 R |
| 5,244,716 | 9/1993 | Thornton et al. ................... 2/239 |

FOREIGN PATENT DOCUMENTS

| | | | |
|---|---|---|---|
| 248869 | 2/1961 | Australia | ................... 2/239 |
| 185801 | 9/1985 | Japan | ................... 2/239 |

OTHER PUBLICATIONS

Gore-Tex letter of Jan. 15, 1980 from W. L. Gore & Associates, Inc.

*Primary Examiner*—Clifford D. Crowder
*Assistant Examiner*—Diana L. Biefeld
*Attorney, Agent, or Firm*—Schmeiser, Morelle & Watts

[57] ABSTRACT

A thin, oversized, waterproof and water vapor permeable oversock which is adapted to be obtrusively worn over a wearer's foot and/or sock within a shoe, sneaker, boot or other type of footwear. The oversock includes a heat sealable, waterproof and water vapor permeable inner liner which is fully enclosed and freely movable within an outer protective shell. A stretchable knit cuff is affixed to an upper end of both the inner liner and the outer shell to prevent the oversock from sliding down a wearer's leg.

16 Claims, 2 Drawing Sheets

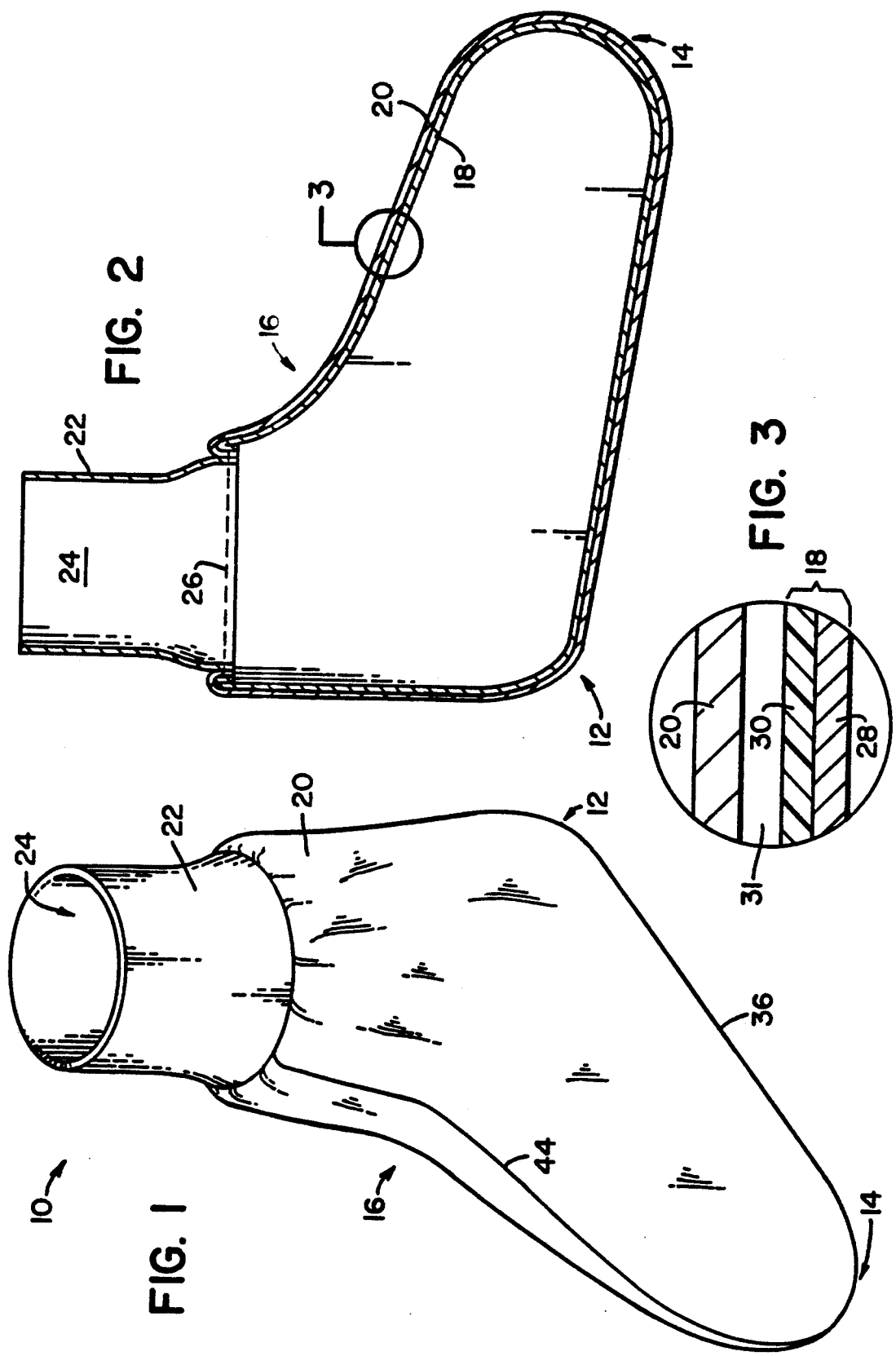

WATERPROOF OVERSOCK

FIELD OF THE INVENTION

The present invention relates to a waterproof foot covering and, more particularly, to a thin, oversized, waterproof and water vapor permeable oversock which is adapted to be unobtrusively worn over a wearer's foot and/or sock within a shoe, sneaker, boot or other type of footwear. The oversock includes a heat sealable, waterproof and water vapor permeable inner liner which is fully enclosed and freely movable within an outer protective fabric shell. The inner liner and the outer shell are advantageously formed out of thin, substantially nonstretchable, nonbunching and self-smoothing fabrics which are adapted to prevent the oversock from wrinkling and bunching about a wearer's foot when inserted into an article of footwear.

BACKGROUND OF THE INVENTION

Several form fitting, waterproof and water vapor permeable (breathable) sock-type articles have recently been developed in an attempt to prevent a wearer's feet from becoming uncomfortably damp or wet within shoes, boots or other types of footwear. These socks, which are designed to be worn over the foot and/or an ordinary sock, are typically constructed out of a fabric having a microporous, waterproof, and breathable GORE-TEX membrane laminated thereto. As is well known in the art, the GORE-TEX membrane includes billions of minute pores per square inch which are sized to prevent external moisture from passing therethrough while simultaneously allowing water vapor from foot perspiration to escape outwards. Unfortunately, as detailed below, the prior art waterproof, breathable sock-type articles suffer from several disadvantages.

Presently available waterproof, breathable socks are typically constructed by stitching together one or more sections of a GORE-TEX laminated fabric. For example, a first commonly available sock is constructed by stitching together a waterproof, nonelastic, nonstretch sole component, a waterproof, nonelastic, nonstretch calf component and a waterproof, breathable, elastic and stretchable vamp component, wherein each of these components is formed using a three-ply laminate material having a waterproof, breathable, porous GORE-TEX membrane sandwiched between nylon-type fabrics. Similarly, a second such sock is formed using a single piece of a GORE-TEX laminated fabric which is adapted to be stitched together in the shape of a foot. Each of these socks is specifically designed to be form fitting and, as a result, must be provided in a plurality of sizes in order to accommodate different size feet. Unfortunately, due to the nature of the GORE-TEX fabrics and the resultant stitching which is required during the construction of the above-described socks, the stitched seams may include a plurality of holes and gaps which are large enough to permit the passage of external moisture therethrough. As a result, each of the stitched seams must be covered with a waterproof seam tape which adds an undesirable amount of stiffness and bulkiness to the socks.

As stated above, currently available waterproof socks are adapted to fit snugly about a wearer's foot and, as such, may be uncomfortably constricting, potentially reducing the flow of blood to a wearer's foot. The reduced blood flow, which may be exacerbated if one or more ordinary socks are worn under the waterproof sock, may lead to a premature cooling of the foot. As a result, the form fitting design of the currently available waterproof socks may limit their usefulness in cold environments, regardless of any waterproofing they may provide. Although this disadvantage may be overcome to some degree by wearing a waterproof sock which is several sizes too large, the resultant excess GORE-TEX fabric will generally wrinkle and/or bunch up uncomfortably about the foot.

SUMMARY OF THE INVENTION

In order to avoid the disadvantages of the prior art, the present invention provides an oversized, waterproof and water vapor permeable oversock having a waterproof, breathable, and heat sealable inner liner which is fully enclosed and freely moveable within an outer protective fabric shell. In the preferred embodiment, only the upper open ends of the inner liner and the outer shell are joined together, thereby allowing the inner liner to move independently within the outer shell. A stretchable, nylon or polyester knitted cuff, which is affixed to an upper end of both the inner liner and the outer shell, is provided to prevent the oversock from inadvertently slipping down the leg of a user.

The oversized, waterproof and breathable oversock of the present invention, which is constructed out of thin, lightweight, substantially nonstretchable and self-smoothing fabrics, is adapted to loosely and unobtrusively enclose a wide range of foot sizes when inserted into an article of footwear. The oversock is adapted to transform itself as needed, according to a wearer's foot size, to prevent any uncomfortable bunching or wrinkling of excess oversock fabric. Unlike the tight, constricting and form fitting waterproof socks of the prior art, the oversock of the instant invention fits comfortably, loosely and nearly imperceptibly about the foot.

The present invention utilizes an inner liner having an aperture proximate an upper, open end and an oversized, foot shaped body extending downward therefrom which is adapted to loosely enclose a wearer's foot. The liner is composed of a protective substrate fabric having a waterproof, breathable and heat sealable film laminated on one side. Preferably, the inner liner is composed of a 40 denier mesh nylon tricot substrate having a 0.75 mil ±5% waterproof, breathable, and heat sealable TRIAD ® film (developed by Gates-Mills, Inc.) laminated on one side. Alternately, we have determined that the inner liner may be composed of a 25–55 denier mesh nylon or polyester tricot substrate having a 0.6–0.9 mil TRIAD film laminated thereto. We have found that an inner liner constructed using a substrate of less than 25 denier is too weak for a sock-type article because it is easily abraded or otherwise damaged by the foot while an oversock constructed using a substrate of greater than 55 denier is too bulky. Similarly, a TRIAD film having a thickness of less than 0.6 mil is not appropriate for the present invention because it does not have adequate strength while a TRIAD film having a thickness greater than 0.9 mil loses its breathability.

The inner liner is preferably constructed from a single, unitary piece of the TRIAD laminated substrate fabric having first and second sections each adapted to form an opposing side of the oversized, foot shaped body. In particular, the oversized, foot shaped body of the inner liner is formed by heat sealing the TRIAD laminated side of a peripheral edge portion of the first section of the unitary piece of fabric against the TRIAD laminated side of a corresponding peripheral edge portion of the second section. Advantageously, the heat sealed edge portions form a waterproof seam without the stitching and waterproof seam tape required by prior art waterproof socks. The thus formed inner liner is then turned inside out, thereby exposing the TRIAD laminated side of the substrate fabric and lining the interior of the liner with the substrate fabric. By turning the liner inside out, the waterproof, water vapor permeable TRIAD film is protectively isolated from a wearer's foot by the intervening substrate fabric.

The protective outer shell of the present invention preferably includes an oversized, foot shaped body which is adapted to loosely enclose the inner liner of the oversock, thereby sandwiching the TRIAD laminated exterior of the inner liner between two protective layers, namely, the interior substrate fabric of the inner liner and the protective outer shell. An upper end of the outer shell is secured to the inner liner proximate the upper, open end thereof and to a lower section of the stretchable, knit cuff, thereby fully enclosing the inner liner and protecting the TRIAD laminated exterior thereof against abrasion and/or other external damaging influences. The protective outer shell of the oversock may be constructed from a 25–55 denier mesh nylon tricot, although a 40 denier mesh nylon tricot is preferred because it provides a desirable balance of thinness, weight and strength.

The outer shell is constructed by suitably stitching together the opposing foot shaped sections of a precut, unitary piece of the above-described fabric, although a plurality of separate fabric pieces may be appropriately joined to form the outer shell if desired.

The outer shell of the present invention serves not only as a protective barrier for the waterproof, breathable inner liner, but also as a moisture wicking and dispersing medium. Advantageously, the water vapor produced by foot perspiration is dispersed by the nylon outer shell after it has moved outward through the TRIAD laminated substrate fabric of the inner liner.

BRIEF DESCRIPTION OF THE DRAWINGS

FIG. 1 is a perspective view of a waterproof oversock according to the preferred embodiment of the present invention;

FIG. 2 is a cross-sectional view of the waterproof oversock illustrated in FIG. 1;

FIG. 3 is an enlarged section of the cross-sectional view of FIG. 2;

DETAILED DESCRIPTION OF THE INVENTION

Figure 4:
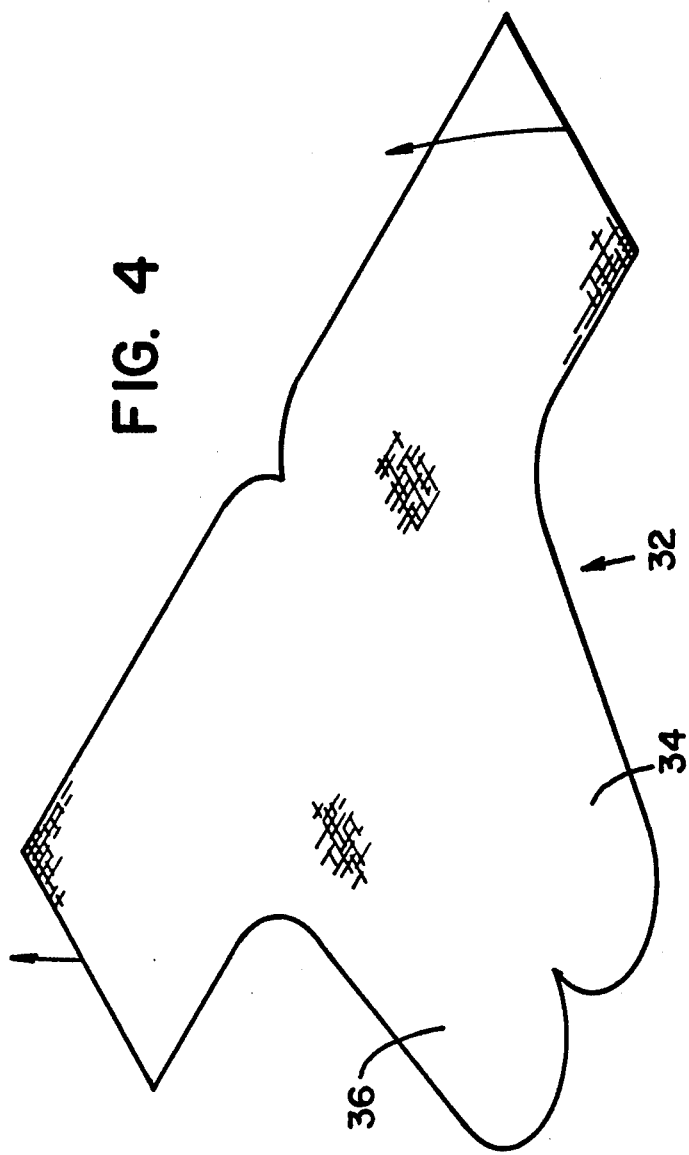
FIG. 4 is a perspective view of the inner liner of the present invention prior to heat sealing.

Referring now specifically to the drawings, there is illustrated a waterproof oversock according to the preferred embodiment of the invention, wherein like reference numerals refer to like parts throughout the drawings.

As illustrated in FIGS. 1 and 2, the waterproof oversock of the present invention, generally designated as 10, is sized to loosely and unobtrusively enclose a plurality of different foot sizes when inserted into an article of footwear. For example, a "large" oversock, which is sized to accommodate a wide range of adult male foot sizes, has a length of approximately eleven inches and a circumference of approximately eight, fourteen and ten inches about the toe, heel/instep and ankle sections thereof, respectively. In particular, the length of the oversock from the heel section 12 to the toe section 14 is substantially less than the circumference of the oversock when measured from the heel section 12 about the instep section 16.

The oversock of the instant invention includes a waterproof, water vapor permeable, oversized foot shaped inner liner 18, an outer, oversized, foot shaped protective fabric shell 20, a stretchable, knitted cuff 22 and an aperture 24 for receiving a foot therein. As shown, the outer shell 20 is secured proximate the upper, open end of the inner liner 18 by stitching 26. The stitching 26 also joins the cuff 22 about an upper end of both the inner liner and the outer shell. The portion of the oversized, foot shaped inner liner 18 which extends downward from the stitching 26 is fully enclosed and freely movable within the outer protective shell 20.

Referring now to FIG. 3, there is illustrated an enlarged cross-section of the inner liner 18 and the outer shell 20. The inner liner includes a substrate fabric 28, preferably a 40 denier mesh nylon tricot, having a 0.75 mil ±5% waterproof, water vapor permeable and heat sealable TRIAD film 30 laminated thereon. As shown, the TRIAD film 30 is protectively and movably sandwiched between the substrate fabric 28 and the outer shell 20. The inner liner 18 and the outer shell 20 are adapted to move freely and independently against one another because of the gap 31 therebetween.

Figure 5:
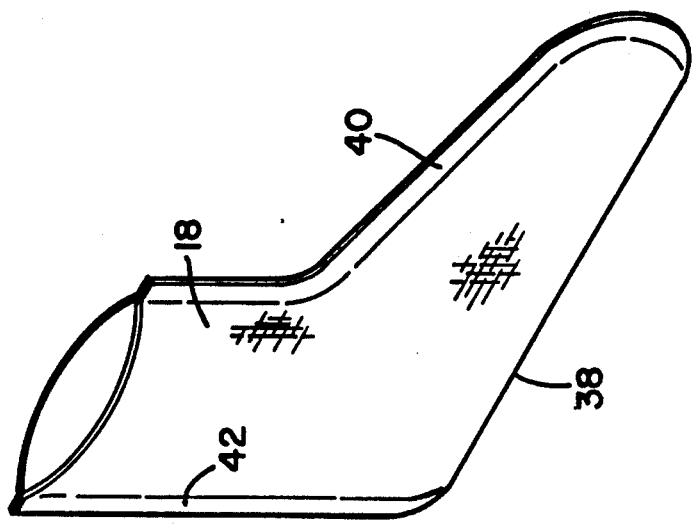
FIG. 5 is a perspective view of the inner liner after heat sealing.

A method for constructing the inner liner 18 is illustrated in FIGS. 4–5. As shown, the inner liner is formed from a unitary piece 32 of the TRIAD laminated substrate fabric having first and second sections 34, 36, each adapted to form an opposing side of the oversized, foot shaped body of the inner liner. As indicated by the arrows in FIG. 4, the inner liner 18 is formed by heat sealing the TRIAD laminated side of a peripheral edge portion of the first section 34 against the TRIAD laminated side of a corresponding peripheral edge portion of the second section 36, thereby forming a liner (FIG. 5) having a seamless sole 38 and continuous and waterproof instep and heel seams 40, 42. The thus formed inner liner is then turned inside out to expose the TRIAD laminated side of the substrate fabric, prior to being joined to the outer shell 20 and cuff 22.

The outer shell 20 is constructed in a similar manner by stitching together the appropriate peripheral edge portions of a suitably shaped, unitary piece of a 40 denier mesh nylon tricot fabric. Referring now to FIG. 1, the outer shell is preferably formed to include a stitched instep seam 44, a stitched heel seam (not shown) which extends from the heel section 12 to the cuff 22 and a seamless sole 46.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, although the construction of the inner liner has been described above in terms of a unitary piece of the TRIAD laminated substrate fabric, it should be clear that a plurality of pieces may be combined as necessary to form the oversized, foot shaped body of the inner liner. Such modifications and variations that may be apparent to a person skilled in the art are intended to be included within the scope of this invention as defined by the accompanying claims.

I claim:

1. A waterproof oversock comprising:
   an inner liner composed of a waterproof, water vapor permeable, substantially nonstretchable fabric, said inner liner having an oversized, foot shaped body for loosely enclosing a wearer's foot, said foot shaped body including an aperture at an upper end for receiving a wearer's foot therein;
   a substantially nonstretchable, protective outer fabric shell for enclosing said inner liner, said outer shell including an oversized, foot shaped body; and
   means for securing the foot shaped body of said outer shell about the foot shaped body of said inner liner.

2. The waterproof oversock according to claim 1 wherein said waterproof, water vapor permeable inner liner fabric is heat sealable.

3. The waterproof oversock according to claim 2 wherein said inner liner is constructed by heat sealing together at least one piece of said heat sealable inner liner fabric, said heat sealing forming waterproof seams.

4. The waterproof oversock according to claim 1 wherein said inner liner fabric includes a substrate material having a layer of a heat sealable, waterproof and water vapor permeable material laminated thereon.

5. The waterproof oversock according to claim 4 wherein said substrate material is composed of a 25 to 55 denier fabric.

6. The waterproof oversock according to claim 4 wherein said layer of a heat sealable, waterproof and water vapor permeable material has a thickness of 0.6 to 0.9 mil.

7. The waterproof oversock according to claim 1 wherein said protective outer fabric shell is composed of a 25 to 55 denier fabric.

8. The waterproof oversock according to claim 1 wherein said oversock has a heel section, a toe section and an instep section, and wherein the length of the oversock from the heel section to the toe section is less than the circumference of the oversock when measured from the heel section about the instep section.

9. The waterproof oversock according to claim 1 wherein said inner liner and said protective outer fabric shell are further formed from substantially nonbunching and self-smoothing fabrics.

10. The waterproof oversock according to claim 1 wherein said protective outer fabric shell is further formed from a moisture wicking and dispersing fabric.

11. A method of producing a waterproof oversock comprising the steps of:
    heat sealing together at least one piece of a waterproof, water vapor permeable, heat sealable and substantially nonstretchable fabric in order to form an oversized, foot shaped inner liner for loosely enclosing a wearer's foot, said heat sealing forming waterproof seams;
    enclosing said oversized, foot shaped inner liner within a substantially nonstretchable, protective outer fabric shell, said protective outer fabric shell including an oversized, foot shaped body; and
    securing the oversized, foot shaped inner liner within the oversized, foot shaped body of said protective outer fabric shell.

12. The method according to claim 10 further including the step of:
    forming the waterproof, water vapor permeable, heat sealable and substantially nonstretchable fabric of said oversized, foot shaped inner liner by laminating a layer of a heat sealable, waterproof and water vapor permeable material onto a substrate fabric.

13. The method according to claim 12 wherein in said enclosing step, the laminated layer of said heat sealable, waterproof and water vapor permeable material is positioned adjacent an inner portion of said protective outer fabric shell.

14. A waterproof oversock comprising:
    an inner liner composed of a waterproof, water vapor permeable, substantially nonstretchable composite fabric, said composite fabric including a substrate fabric having a layer of a heat sealable, waterproof and water vapor permeable material laminated thereon, said inner liner having an oversized, foot shaped body for enclosing a wearer's foot, said foot shaped body including an aperture at an upper end for receiving a wearer's foot therein;
    a substantially nonstretchable, protective outer fabric shell for enclosing said inner liner, said outer shell including an oversized, foot shaped body; and
    means for securing the foot shaped body of said outer shell about the foot shaped body of said inner liner, wherein the foot shaped body of said inner liner is freely movable within the foot shaped body of said protective outer fabric shell.

15. The waterproof oversock according to claim 14 wherein said protective outer fabric shell and the substrate fabric of said inner liner are further formed from substantially nonbunching and self-smoothing fabrics.

16. The waterproof oversock according to claim 14 wherein said protective outer fabric shell is further formed from a moisture wicking and dispersing fabric.

* * * * *

UNITED STATES PATENT AND TRADEMARK OFFICE
CERTIFICATE OF CORRECTION

PATENT NO. : 5,325,541

DATED : 7/5/94

INVENTOR(S) : WILLARD, Ellery T.

It is certified that error appears in the above-identified patent and that said Letters Patent is hereby corrected as shown below:

Title page, col. 2,
In the Abstract, line 2, "obtrusively" should read
--unobtrusively--.

Signed and Sealed this

Twentieth Day of September, 1994

Attest:

BRUCE LEHMAN

Attesting Officer

Commissioner of Patents and Trademarks